US009841754B2

(12) United States Patent
Fukatsu

(10) Patent No.: US 9,841,754 B2
(45) Date of Patent: Dec. 12, 2017

(54) INFORMATION-LINKAGE SUPPORTING APPARATUS AND INFORMATION-LINKAGE SUPPORTING PROGRAM

(71) Applicant: Mitsubishi Electric Corporation, Chiyoda-ku, Tokyo (JP)

(72) Inventor: Noriyasu Fukatsu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 100 days.

(21) Appl. No.: 14/893,184

(22) PCT Filed: Apr. 25, 2014

(86) PCT No.: PCT/JP2014/061782
§ 371 (c)(1),
(2) Date: Nov. 23, 2015

(87) PCT Pub. No.: WO2015/162794
PCT Pub. Date: Oct. 29, 2015

(65) Prior Publication Data
US 2016/0091890 A1 Mar. 31, 2016

(51) Int. Cl.
*G05B 19/418* (2006.01)
*G05B 19/05* (2006.01)
(Continued)

(52) U.S. Cl.
CPC ......... *G05B 19/4185* (2013.01); *G05B 19/05* (2013.01); *G05B 19/4093* (2013.01);
(Continued)

(58) Field of Classification Search
CPC G05B 19/4185; G05B 19/05; G05B 19/4093; G05B 19/414
(Continued)

(56) References Cited

U.S. PATENT DOCUMENTS

2002/0193905 A1\* 12/2002 Davison ............. G05B 19/4185
700/180
2003/0208293 A1\* 11/2003 Mountcastle, III .........
G05B 19/41865
700/96
(Continued)

FOREIGN PATENT DOCUMENTS

EP 2 866 108 A1 4/2015
JP 04-216147 A 8/1992
(Continued)

OTHER PUBLICATIONS

Communication dated Nov. 21, 2016 from the German Patent and Trademark Office in counterpart Application No. 11 2014 002 981.5.
(Continued)

*Primary Examiner* — Vincent Tran
(74) *Attorney, Agent, or Firm* — Sughrue Mion, PLLC; Richard C. Turner

(57) ABSTRACT

An information-linkage supporting apparatus includes: a schema-information acquiring unit acquiring schema information concerning the configuration of numerical control data stored by a numerical-control-data storing apparatus as a database, from the numerical-control-data storing apparatus; a memory-map-information acquiring unit acquiring memory map information concerning memory allocation in the data memory of the numerical control data stored by a numerical control apparatus in an inside thereof, from the numerical control apparatus; a mapping-table generating unit generating, on the basis of association instruction information inputted from the outside for instructing association between constituent elements of the schema information and constituent elements of the memory map information, a mapping table, which is information for information linkage obtained by associating and mapping the constituent ele-
(Continued)

ments of the schema information and the constituent elements of the memory map information; and a mapping-table transmitting unit transmitting the mapping table to the numerical control apparatus.

11 Claims, 11 Drawing Sheets

(51) Int. Cl.
G05B 19/4093 (2006.01)
G05B 19/414 (2006.01)
(52) U.S. Cl.
CPC .. *G05B 19/414* (2013.01); *G05B 2219/31151* (2013.01); *G05B 2219/31166* (2013.01); *Y02P 90/02* (2015.11)
(58) Field of Classification Search
USPC ........................................................ 700/159
See application file for complete search history.

(56) References Cited

U.S. PATENT DOCUMENTS

| 2007/0174518 A1* | 7/2007 | Chandhoke | G05B 19/054 |
| | | | 710/62 |
| 2014/0018941 A1* | 1/2014 | Brown | G05B 19/0426 |
| | | | 700/56 |
| 2014/0046457 A1* | 2/2014 | Taber | G05B 19/056 |
| | | | 700/2 |
| 2015/0254305 A1* | 9/2015 | Okamura | G05B 19/056 |
| | | | 707/769 |

FOREIGN PATENT DOCUMENTS

| JP | 09-282122 A | 10/1997 |
| JP | 11-224184 A | 8/1999 |
| JP | 2001-134310 A | 5/2001 |
| JP | 2002-023812 A | 1/2002 |
| JP | 3580347 B2 | 10/2004 |
| JP | 2006-099809 A | 4/2006 |
| JP | 2006-243936 A | 9/2006 |
| JP | 2007-038580 A | 2/2007 |
| JP | 2009-175793 A | 8/2009 |
| WO | 2013/191275 A1 | 12/2013 |

OTHER PUBLICATIONS

International Search Report for PCT/JP2014/061782 dated May 27, 2014 [PCT/ISA/210].

Written Opinion for PCT/JP2014/061782 dated May 27, 2014 [PCT/ISA/237].

Notice of Reasons for Refusal for 2015-524525 (corresponding to PCT/JP2004/061782) dated Sep. 29, 2015.

* cited by examiner

FIG.7

| No. | LARGE SEGMENT | SMALL SEGMENT | DATA TYPE | LABEL |
|---|---|---|---|---|
| 1 | SYSTEM INFORMATION | NUMBER OF AXES IN SYSTEM (CROSS CONFIGURATION) | Short | SystemInNumberOfA |
| 2 | | NUMBER OF SYSTEMS | Short | NumberOfSystems |
| 3 | | TOTAL NUMBER OF CONTROLLED AXES | Short | TotalNumberOfControlledAxes |
| 4 | | NUMBER OF MAIN SPINDLES | Short | SpindleAxisNumber |
| 5 | FILE SYSTEM INFORMATION | TOOL TYPE | Char Strings | ToolType |
| 6 | | NUMBER OF TOOL SETS | Short | ToolNumberOfSets |
| 7 | | NUMBER OF WORK OFFSET SETS | Short | WorkOffsetNumberOfSets |
| 8 | LIFE MANAGEMENT INFORMATION | USING NUMBER FOR LIFE MANAGEMENT | Short | LifeManagementUsingNumber |
| 9 | MAIN SPINDLE INFORMATION | MAIN SPINDLE ROTATING SPEED | Float | SpindleRotationSpeed |
| 10 | OPERATION STATE | ALARM STATE SIGNAL | Short | AlarmConditionSignal |
| 11 | PROGRAM EXECUTION STATE | PATH OF CURRENTLY EXECUTED PROGRAM | Char Strings | CurrentExeProgramPath |
| 12 | | NAME OF CURRENTLY EXECUTED PROGRAM | Char Strings | CurrentExeProgramName |
| 13 | | STATE OF CURRENTLY EXECUTED PROGRAM | Short | CurrentExeProgramStatus |
| 14 | | NAME OF PROGRAM EXECUTED LAST | Char Strings | LastExeProgramName |
| 15 | | STATE OF PROGRAM EXECUTED LAST | Short | LastExeProgramStatus |

⋮

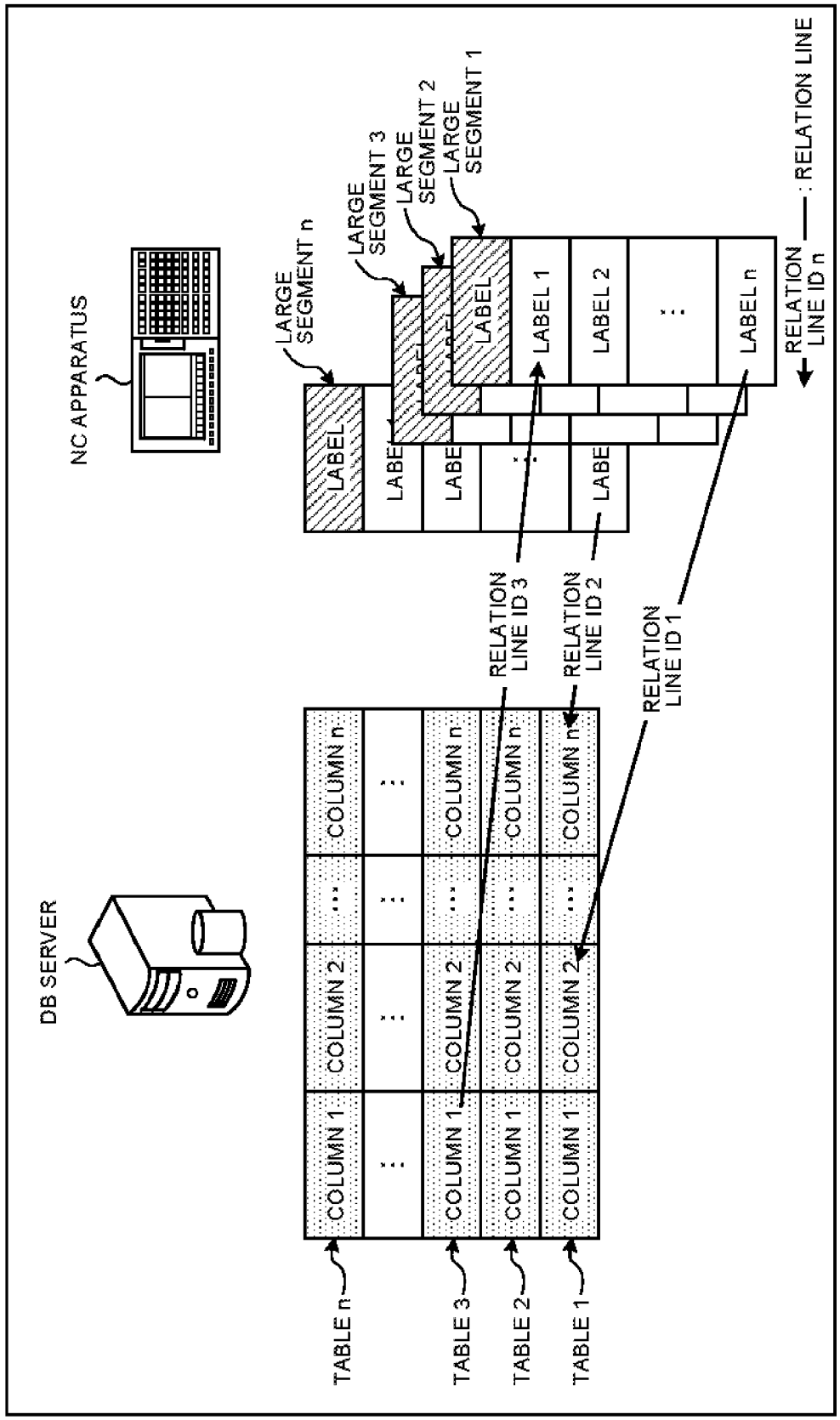

TABLE 4
TABLE 3
TABLE 2
TABLE 1

| COLUMN NAME |
|---|
| ABC |
| DEF |
| HIJ |
| KLM |
| NPQ |
| RST |
| UVW |
| XYZ |

(b)

| LABEL | DATA TYPE |
|---|---|
| SystemInNumberOfA | Short |
| NumberOfSystems | Short |
| TotalNumberOfControlledAxes | Short |
| SpindleAxisNumber | Short |
| ToolOffsetType | Char Strings |
| ToolOffsetNumberOfSets | Short |
| WorkOffsetNumberOfSets | Short |
| LifeManagementUsingNumber | Short |
| SpindleRotationSpeed | Float |
| MacroExecutionLevel | Short |
| AlarmConditionSignal | Short |
| CurrentExeProgramPath | Char Strings |
| CurrentExeProgramName | Char Strings |

| TABLE NAME | COLUMN NAME | LABEL NAME | RELATION LINE ID |
|---|---|---|---|
| 1 | ABC | SystemInNumberOfA | 2 |
| 2 | DEF | NumberOfSystems | 1 |
| 3 | HIJ | TotalNumberOfControlledAxes | 3 |

TABLE 1: COMBINATIONS OF COLUMN-LABEL (b)

| RELATION LINE ID | DATA OPERATION METHOD | DATA OPERATION CONDITION |
|---|---|---|
| 1 | INSERT | 100 msec CYCLE |
| 2 | UPDATE | DEVICE On |
| 3 | SELECT | DEVICE On |

TABLE 2: COMBINATIONS OF ACTIONS

INFORMATION-LINKAGE SUPPORTING APPARATUS AND INFORMATION-LINKAGE SUPPORTING PROGRAM

CROSS REFERENCE TO RELATED APPLICATIONS

This application is a National Stage of International Application No. PCT/JP2014/061782 filed Apr. 25, 2014, the contents of all of which are incorporated herein by reference in their entirety.

FIELD

The present invention relates to an information-linkage supporting apparatus and an information-linkage supporting program.

BACKGROUND

In general, a numerical control (hereinafter referred to as NC) apparatus is comprised of an NC control unit, a commanding section mainly consisting of an NC operation panel and a driving section configured to have a servo amplifier, a main spindle amplifier, a motor or a detector. At present, a CNC (Computerized NC) apparatus incorporating a high-performance dedicated microcomputer and having ability to realize complicated and advanced control with high reliability is also used as a kind of the NC apparatus.

The NC apparatus is also capable of performing sequence control according to an input signal from a sensor, a switch, or the like set in a machine tool. A target of the control is an operation involved around a machine such as tool replacement or cutting chip removal. A description of a series of machining operations for the NC apparatus is called NC programming. This represents a tool path, a machining condition, or the like that is necessary for the machining in a form of commands for the NC apparatus. The NC program can be downloaded from an external program automatic generating apparatus to the NC apparatus or can be directly inputted from the NC operation panel.

In general, the NC apparatus is used in a field where higher-speed and more highly accurate control, which cannot be realized in a system constructed by combining a general-purpose sequencer and a general-purpose servo, is required. Such an NC apparatus has a high real-time property for performing a response at high speed of 0.5 millisecond or less in a servo system and can perform highly accurate control that enables control with a 0.1 micrometer level. The NC apparatus also has a stable characteristic by which the NC apparatus is allowed to perform advanced servo acceleration and deceleration control so as not to cause vibration while having the high real-time property and performing the highly-accurate control. The NC apparatus is capable of performing correction control for a machine in adapting to backlash, twist, bend, expansion and contraction, and the like that may occur because of rigid factors of a machine. The NC apparatus is also capable of performing synchronous control by which one workpiece moving to another machining area can be machined simultaneously with a plurality of gears without stopping rotation of the rotating workpiece.

The NC apparatus is also capable of implementing an interactive programming for interactively inputting a machining shape and creating a machining program, a graphic simulation function for simulation of the machining and for calculating a machining time, and the like.

In recent years, in a factory, to immediately respond to changes in a production situation and the like, it has become important to quickly perform reference to and evaluation of a change in information concerning production in production facilities. Therefore, a machine tool is also requested to accurately and quickly perform reference to and evaluation of machining information immediately responding to a change in a machining situation. For that reason, an NC apparatus having machining information communication functions explained below has been proposed and put to practical use. One is a function of reading, after designating a file name in the NC apparatus, machining information such as a machining program from an intermediate personal computer for communication, a host computer, or the like. The other is a function of transferring files of a machining plan and a work instruction from the host computer or the like to the NC apparatus online.

Further, in recent years, products and technologies of networks, personal computers and servers have been advanced. On the background of this advancement, there has been a growing demand for a system that can easily realize approaches to quality improvement of products and quick responses to changes in business environment by making use of a data processing apparatus (DB) that collects data matching a specific theme, stores and manages the data in various servers on a network, and enables facilitation of search and extraction, and reuse of desired data and use of DB applications.

For example, Patent Literature 1 discloses, as an NC apparatus having a machining information communication function, a system having structure in which an FA (Factory Automation) network having a programmable controller, a data file that stores data acquired from the programmable controller, and a user application are connected via a data managing apparatus. The data managing apparatus functions as a middleware between the programmable controller and a set of the data file and the user application, which performs processing for storing data collected from a plurality of PLCs in the data file and giving notice to the user application.

CITATION LIST

Patent Literature

Patent Literature 1: Japanese Patent No. 3580347

SUMMARY

Technical Problem

However, the technology of the above-mentioned Patent Literature 1 requires a database that stores data of a machine tool or control apparatus on the FA network side, the data managing apparatus that is a dedicated information processing terminal for storing the data of the machine tool or control apparatus in the database, and the middleware for performing exchange and other operations of the data between the programmable controller and the database in the data managing apparatus. Consequently, there has been a problem in that maintenance expenses of the dedicated information processing terminal increase and costs of operation of the system increase.

Therefore, there are required information linking means and apparatus which do not require installation of a set of an apparatus for linking data of a processing machine with a database, a program creating device and the like on the outside of a machine tool without requiring a dedicated information processing terminal and middleware for storing data of a processing machine in the database, thereby to make it possible to reduce the maintenance expenses and avoid the high-cost structure.

Complicated technical terms such as trigger, job, and action used in design of an apparatus and the like for linking the data of the processing machine with the database are unfamiliar to operators who handle the NC apparatus and the processing machine. Also, the operators do not need to understand the technical terms. However, in view of informatization and various changes in social conditions in recent years, in particular, appearance of big data or the like, it is evident from a trend of the world that, even after the NC apparatus and the processing machine form the big data in cooperation with the DB, desired data should be able to be easily retrieved and extracted from the big data and easily reused. However, the conventional technology mentioned above is not considered to be in a situation in which the NC apparatus and the processing machine can easily cooperate with the DB.

In a use of a general machine tool, a DB and a personal computer for FA are not always necessary. However, when the permeation of automation in recent years and the necessity of traceability are taken into account, information linkage between the machine tool and the DB is unavoidable.

To enable easy data linkage between the processing machine and the database, it is important that easiness of setting is also included. However, it is hard to say that the above-mentioned conventional technology is in a situation in which the NC apparatus and the processing machine can easily cooperate with the DB taking into account even the easiness of setting.

The present invention has been devised in view of the above and it is an object of the present invention to obtain an information-linkage supporting apparatus and an information-linkage supporting program capable of easily and inexpensively realizing linkage of data between a processing machine and a database in a system in which NC data information is linked to a database server.

Solution to Problem

In order to solve the above-mentioned problem and to achieve the object, the present invention provides an information-linkage supporting apparatus that is connected via a network to an information linkage system in which a numerical control apparatus and a numerical-control-data storing apparatus are connected via the network, the numerical control apparatus including a machining unit that applies machining to a workpiece, a data memory that stores numerical control data to be used in the machining of the workpiece and a control unit that performs an arithmetic operation using data in the data memory and controls the machining unit, the numerical-control-data storing apparatus storing data including the numerical control data used in the numerical control apparatus as a database, the information linkage system being adapted to perform information linkage to match the numerical control data between the numerical control apparatus and the numerical-control-data storing apparatus, the information-linkage supporting apparatus creating information for information linkage retained by the numerical control apparatus and used for the information linkage, the information-linkage supporting apparatus comprising: a schema-information acquiring unit that acquires schema information, which is information concerning a configuration of the numerical control data stored by the numerical-control-data storing apparatus as a database, from the numerical-control-data storing apparatus; a memory-map-information acquiring unit that acquires memory map information, which is information concerning memory allocation in the data memory of the numerical control data stored by the numerical control apparatus in an inside thereof, from the numerical control apparatus; a mapping-table generating unit that generates, on the basis of association instruction information inputted from an outside for instructing association between constituent elements of the schema information and constituent elements of the memory map information, a mapping table, which is the information for the information linkage obtained by associating and mapping the constituent elements of the schema information and the constituent elements of the memory map information; and a mapping-table transmitting unit that transmits the mapping table to the numerical control apparatus.

Advantageous Effects of Invention

According to the present invention, there is an effect that it is possible to easily and inexpensively realize linkage of data between a processing machine and a database in a system that links NC data information and a database server.

BRIEF DESCRIPTION OF DRAWINGS

FIG. 7 is a diagram illustrating an internal data configuration example of an NC apparatus.

FIG. 8 is an imaged diagram of a display screen in which an HMI application operating on the middleware according to the embodiment of the present invention causes a display device of the FA personal computer to display.

FIG. 10 is a diagram illustrating information used in generation of a mapping table in a mapping-table generating unit of the middleware according to the embodiment of the present invention.

FIG. 11 is a diagram illustrating an example of mapping tables created by normalization.

DESCRIPTION OF EMBODIMENTS

An embodiment of an information-linkage supporting apparatus and an information-linkage supporting program according to the present invention is explained in detail below with reference to the drawings. Note that the present invention is not limited to the following description and can be changed as appropriate in a range not departing from the spirit of the present invention.

Embodiment

Figure 1:
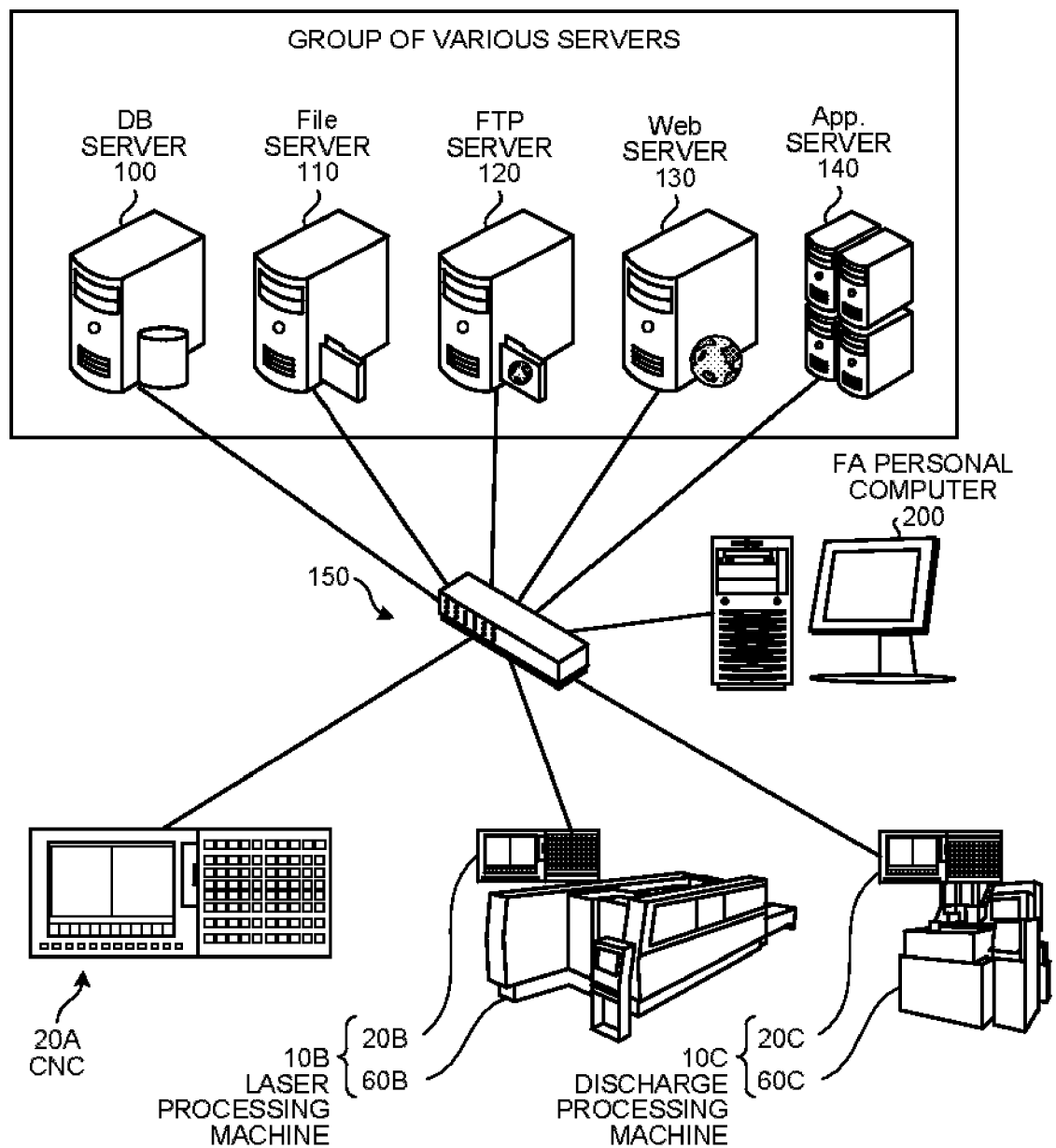
FIG. 1 is a diagram schematically illustrating an example of the configuration of an information supporting system in an embodiment of the present invention.

FIG. 1 is a diagram schematically illustrating an example of the configuration of an information linkage system in this embodiment. The information linkage system has a structure in which a CNC apparatus 20A, which is an NC apparatus, or a processing machine 10B and a processing machine 10C, which are processing machines 10 incorporating NC apparatuses, (in the following explanation, an NC apparatus and a processing machine incorporating an NC apparatus are sometimes collectively referred to as NC apparatus), a database server 100, which is a numerical-control-data storing apparatus that manages data (hereinafter referred to as NC data) and the like used in the CNC apparatus 20A or the processing machines 10B and 10C in a database (hereinafter sometimes referred to as DB), and an FA personal computer 200 functioning as an information-linkage supporting apparatus are connected via a network 150, which is an electric communication line with the ability of communicating with each other. Note that the NC data are data matching a specific theme concerning the NC apparatus. In addition, numerical control data used in machining a workpiece using a processing machine to which the NC apparatus is connected or a processing machine incorporating the NC apparatus, machining information in the NC apparatus, and the like can be exemplified.

As the processing machines 10, a laser processing machine 10B that machines a workpiece with a laser, an electric-discharge processing machine 10C that machines a workpiece with electric discharge, and the like can be used.

The laser processing machine 10B is a working machine developed for a use of performing machining, which cannot be performed even if a conventional edge tool or cutting instrument is used, by using a laser beam for machining or cutting. The laser processing machine 10B includes a driving unit 60B that performs machining on a workpiece and a commanding unit 20B that gives an instruction to the driving unit 60B according to an NC program.

The electric-discharge processing machine 10C is a working machine that adopts a machining method for removing a part of a workpiece surface with arc discharge repeatedly generated at a short cycle between an electrode and the workpiece. By using the electric-discharge processing machine, it is possible to carve a complicated contour from hard metal, extremely hard steel, titanium, carbide, or the like that cannot be machined by the conventional machining technique. The electric-discharge processing machine 10C includes a driving unit 60C that performs machining on the workpiece and a commanding unit 20C that gives an instruction to the driving unit 60C according to an NC program.

In the laser processing machine 10B and the electric-discharge processing machine 10C, the commanding units 20B and 20C, which are NC apparatuses, are incorporated inside to precisely control the movement of a machining part (tool) and realize micromachining. Note that these are exemplifications and the processing machines are not limited to them. For example, this embodiment can be applied to any processing machine that precisely controls the movement of a tool and realizes micromachining with an NC apparatus incorporated in the inside of the processing machine.

The database server (in the figure, described as DB server) 100 means a server having a database inside, in which a database management system is operated. The database server 100 performs processing such as a search of the database in response to, for example, a request from a client and returns a processing result. Most of various servers currently in use adopt a form in which a database is mounted on the inside to perform information management. Thus, any server mounted with a database on the inside is likely to be related to this embodiment even if the server is not named database server. Therefore, as a database server in a broader sense related to this embodiment, in addition to the database server 100, for example, a File server 110, an FTP (File Transfer Protocol) server 120, a Web server 130, and an App. (application) server 140 can be exemplified.

The File server 110 is a server set for sharing a file on a network such as a LAN (Local Area Network) or WAN (Wide Area Network). The FTP server 120 is a server that performs transmission and reception of a file using an FTP. The Web server 130 exchanges information using an HTTP (Hyper Text Transfer Protocol) that is a type of a communication protocol. When receiving a request from a Web browser that is a client, the Web server 130 transmits information such as an HTML (Hyper Text Markup Language) document or an image corresponding to the request. The Web server 130 is one of essential elements in construction of a Web site. The application server 140 means a server that plays a role of executing a program of an application layer in a tri-level model configured by dividing a system for a job into three layers of a presentation layer, an application layer, and a data layer.

Figure 2:
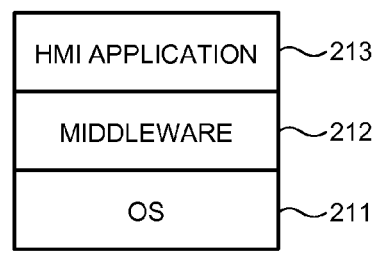
FIG. 2 is a diagram illustrating a concept of a hierarchical structure of a software operating in an FA personal computer.

The FA personal computer 200 functioning as the information-linkage supporting apparatus is configured by, for example, an industrial personal (FA personal computer). The FA personal computer 200 includes a middleware between a human machine interface (HMI) application and an operating system (OS). The information-linkage supporting apparatus is realized when the middleware for realizing a function of the information-linkage supporting apparatus operates on the FA personal computer. FIG. 2 is a diagram illustrating a concept of a hierarchical structure of a software operating in the FA personal computer 200. As shown in FIG. 2, a middleware 212 is located above the level of the OS 211 and an HMI application 213 is located above the middleware 212.

Figure 3:
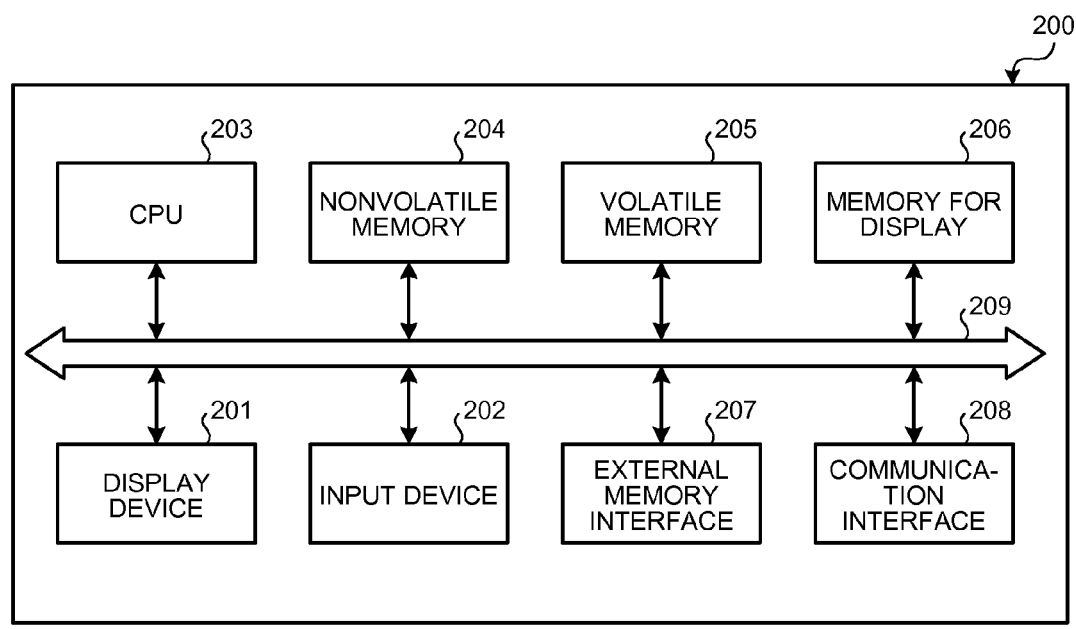
FIG. 3 is a block diagram schematically illustrating an example of the configuration example of the FA personal computer that realizes a function of an information-linkage supporting apparatus according to the embodiment of the present invention.

FIG. 3 is a block diagram schematically illustrating an example of the configuration of the FA personal computer 200 that realizes a function of the information-linkage supporting apparatus. As shown in FIG. 3, the FA personal computer 200 has a configuration in which a display device 201 such as an LCD (Liquid Crystal Display), an input device 202 such as a keyboard, a CPU 203 that performs an arithmetic operation, a nonvolatile memory 204 such as a ROM (Read Only Memory), a volatile memory 205 such as a RAM (Random Access Memory), a memory for display 206 that stores a display screen information to be displayed on the display device 201, an external memory interface 207 that is an interface with a detachable external memory such as a flash memory, a communication interface 208 that performs communication with external apparatuses, and the like are connected via an internal bus 209.

The CPU 203 overall controls the FA personal computer 200 and reads out and executes various programs stored in the memories as appropriate. Processing of the HMI application 213, the middleware 212, and the OS 211 is executed by the CPU 203. That is, the middleware 212, which is an information-linkage supporting program stored in the nonvolatile memory 204 and describing a processing procedure of the function of serving as the information-linkage supporting apparatus, is loaded to the volatile memory 205 and executed by the CPU 203.

This program can be recorded in a computer-readable recording medium such as a hard disk, CD (Compact Disk), ROM (Read Only Memory), MO (Magneto-Optical disk), or DVD (Digital Versatile Disk or Digital Video Disk), or alternatively, can be distributed via a network (communication line) such as the Internet. In this case, the program is stored on the nonvolatile memory 204 from an information processing terminal connected via the communication interface 208.

Figure 4:
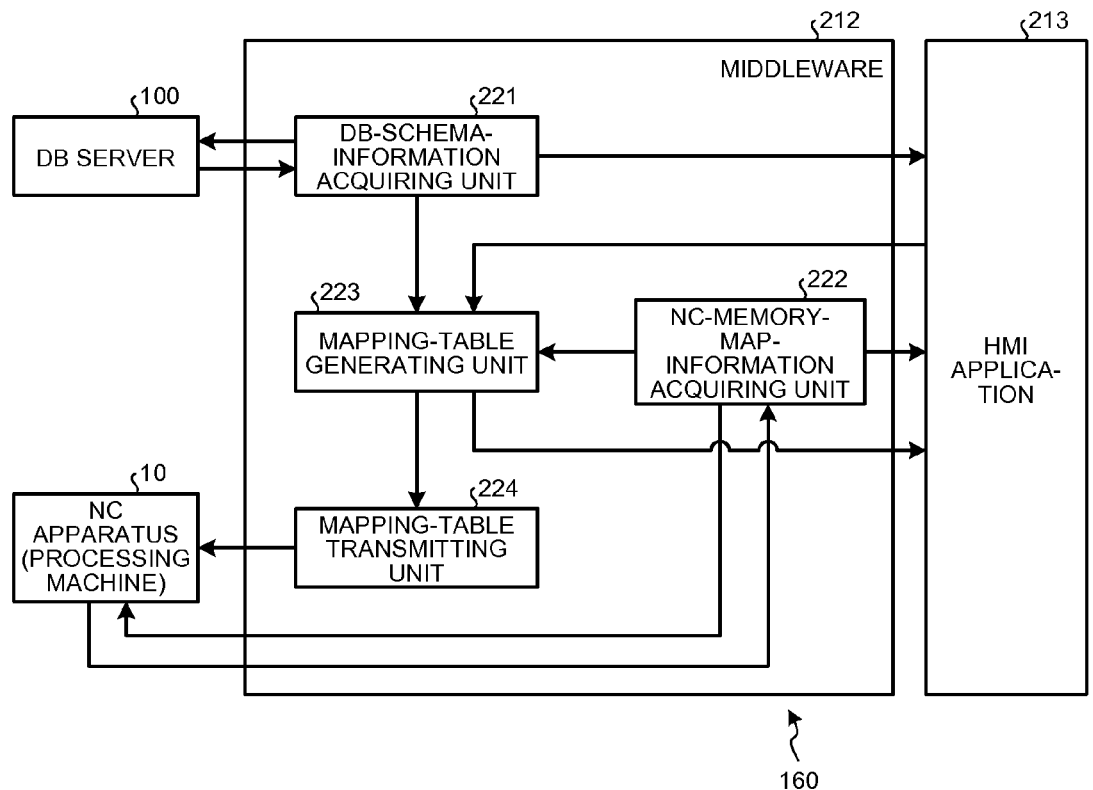
FIG. 4 is a diagram illustrating the configuration of the function of the information-linkage supporting apparatus realized by executing a middleware with a CPU of the FA personal computer according to the embodiment of the present invention.

FIG. 4 is a diagram illustrating the configuration of the function of the information-linkage supporting apparatus realized when the middleware 212 is executed by the CPU 203 of the FA personal computer 200. The middleware 212 includes a DB-schema-information acquiring unit 221, an NC-memory-map-information acquiring unit 222, a mapping-table generating unit 223, and a mapping-table transmitting unit 224. These components can transmit information to and receive information from one another. Arrows in FIG. 4 indicate flows of the information.

The DB-schema-information acquiring unit 221 communicates with the database server 100, notifies the database server 100 of a request for schema information, and acquires the schema information of the DB from the database server 100. A schema means a logical storage location of a list, that is, a table of DBs in a DB storing unit of the database server 100. The schema has a function similar to that of a directory in a file system. Tables related to each other are stored in the same schema. Information concerning the configuration of NC data in such a database server 100 is called schema information. As the schema information, there are, for example, a table name and a column name of a table included in a database. The DB-schema-information acquiring unit 221 provides the mapping-table generating unit 223 with the schema information.

The NC apparatus has, on the inside thereof, various kinds of information to perform machining. That is, in a memory of the NC apparatus, an NC program that is a machining program necessary in performing machining, data used in an arithmetic operation by the machining program or outputted as a result of the arithmetic operation, NC data subjected to information linkage with the database server 100, and the like are stored. These data are stored in a volatile memory or a nonvolatile memory in the NC apparatus according to their uses, respectively. Usually, the NC apparatus displays information on a display unit incorporated in the NC apparatus main body, receives a command from an operator in an input unit present in the display unit, and performs machining on the basis of the content of the command.

The NC-memory-map-information acquiring unit 222 communicates with the NC apparatus, notifies the NC apparatus of a request for NC memory map information, and acquires the NC memory map information from the NC apparatus. Information concerning memory allocation of the memory in the NC apparatus for the NC data subjected to information linkage with the database server 100 inside the NC apparatus is referred to as NC memory map information.

The mapping-table generating unit 223 provides the HMI application 213 located above the middleware 212 with the schema information of the DB acquired by the DB-schema-information acquiring unit 221 and the NC memory map information of the NC apparatus acquired by the NC-memory-map-information acquiring unit 222. Consequently, the HMI application 213 can recognize information concerning a storage destination of the table of the DBs in the database server 100 and a data content inside the NC apparatus, so that so-called "visualization" of data can be realized.

The HMI application 213 displays the provided schema information and the provided memory map information on the display device 201 of the FA personal computer 200. A user inputs association instruction information for instructing association of constituent elements of the schema information with constituent elements of the NC memory map information, from the input device 202, on the basis of information of the schema information and the NC memory map information displayed on the display device 201.

The mapping-table generating unit 223 receives the association instruction information inputted from the input device 202 by the user, and generates a mapping table that is combination information indicating combinations of the schema information of the database and the NC memory map information of the NC apparatus to be linked. That is, the mapping-table generating unit 223 generates, on the basis of the association instruction information, a mapping table that is information for information linkage in which the constituent elements of the schema information and the constituent elements of the NC memory map information are associated with each other and mapped. The information for information linkage is used in performing information linkage of the NC data between the NC apparatus and the database server 100. Then, the mapping-table generating unit 223 transmits the generated mapping table to the mapping-table transmitting unit 224.

The NC apparatus transmits an information linkage command for accessing the database in the database server 100 and performs information linkage of NC data, that are numerical control data, between the NC apparatus and the database server 100 so as to match data stored in the database server 100 and corresponding to NC data of the NC apparatus with NC data collected by the NC apparatus. The mapping table is referred to by the NC apparatus when generating the information linkage command. The mapping table is combination information for associating, concerning NC data for performing information linkage, the schema information that is information on a storage destination of the table of the DBs in the database server 100, and the NC memory map information that is information on memory allocation for NC data subjected to information linkage with the database server 100 inside the NC apparatus.

In this way, the mapping-table generating unit 223 has a function of a schema-information providing unit that provides the HMI application 213 with the schema information of the DB, a function of an NC-apparatus-memory-map-information providing unit that provides the HMI application 213 with the memory map information of the NC apparatus, and a function of generating the mapping table on the basis of the schema information, the memory map information, and the association instruction information.

Note that, in the above explanation, the mapping-table generating unit 223 provides the HMI application 213 with the schema information and the memory map information. However, another form may be adopted in which the DB-schema-information acquiring unit 221 provides the HMI application 213 with the schema information and the NC-memory-map-information acquiring unit 222 provides the HMI application 213 with the NC memory map information.

The mapping-table transmitting unit 224 receives the mapping table generated by the mapping-table generating unit 223 and transmits the mapping table to the NC apparatus.

In this way, the information-linkage supporting apparatus is configured using the FA personal computer 200 and the middleware 212. Consequently, a dedicated information processing terminal for linkage of the NC data between the NC apparatus and the database is unnecessary. Therefore, costs such as maintenance expenses of the information processing terminal are not incurred, and so it is possible to inexpensively realize linkage of the NC data between the NC apparatus and the database.

The FA personal computer 200 is connected to the NC apparatus and the database server 100 via the network 150. Therefore, the FA personal computer 200 does not need to be set in a work site where the NC apparatus is disposed, so that footprints in the work site do not increase.

Figure 5:
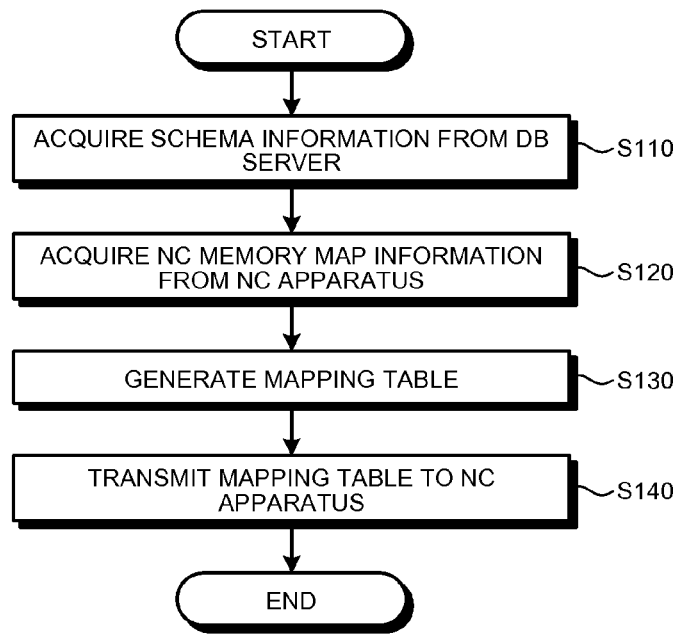
FIG. 5 is a flowchart showing an example of a procedure of processing in the middleware according to the embodiment of the present invention.

Processing in the middleware 212 is now explained. FIG. 5 is a flowchart showing an example of a procedure of the processing in the middleware 212. First, the DB-schema-information acquiring unit 221 notifies the database server 100 of a request for schema information of the DB.

The database server 100 transmits the schema information to the DB-schema-information acquiring unit 221 in response to the request for the schema information. The DB-schema-information acquiring unit 221 receives the schema information transmitted from the database server 100 and acquires the schema information (step S110). The DB-schema-information acquiring unit 221 transmits the acquired schema information to the mapping-table generating unit 223.

Subsequently, the NC-memory-map-information acquiring unit 222 notifies the NC apparatus of a request for NC memory map information. The NC apparatus transmits, in response to the request for the NC memory map information, the NC memory map information to the NC-memory-map-information acquiring unit 222. The NC-memory-map-information acquiring unit 222 receives the NC memory map information transmitted from the NC apparatus and acquires the NC memory map information (step S120). The NC-memory-map-information acquiring unit 222 transmits the acquired NC memory map information to the mapping-table generating unit 223.

Subsequently, the mapping-table generating unit 223 transmits the schema information of the DB and the memory map information to the HMI application 213. The HMI application 213 receives the schema information and the memory map information and is adapted to display the schema information and the memory map information on the display device 201 of the FA personal computer 200. The user inputs, on the basis of information of the schema information and the memory map displayed on the display device 201, association instruction information for instructing association of the schema information and the memory map information from the input device 202.

The mapping-table generating unit 223 receives, through the HMI application 213, the association instruction information inputted from the input device 202. The mapping-table generating unit 223 generates a mapping table on the basis of the association instruction information (step S130). Then, the mapping-table generating unit 223 transmits the generated mapping table to the mapping-table transmitting unit 224.

The mapping-table transmitting unit 224 receives the mapping table transmitted from the mapping-table generating unit 223 and transmits the mapping table to the NC apparatus (step S140).

Note that, when receiving the mapping table transmitted from the mapping-table transmitting unit 224, the NC apparatus stores the mapping table. The NC apparatus then recognizes, according to a content of the mapping table, allocation of data of the memory and schemas of the DB inside the NC apparatus, and inserts the NC data inside the NC apparatus into the database server 100.

Figure 6:
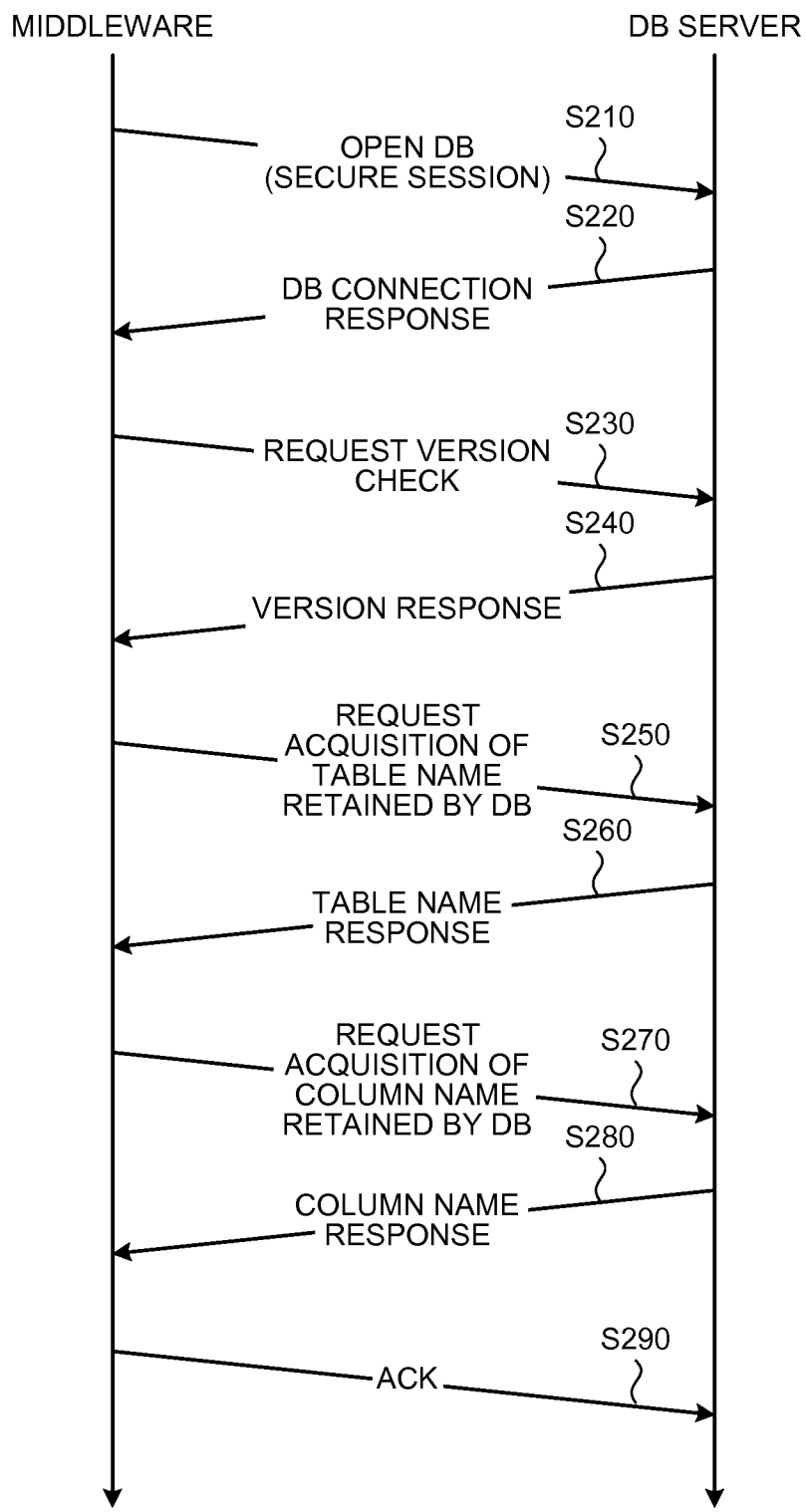
FIG. 6 is a sequence chart illustrating an example of an exchange procedure for schema information between the middleware and a database server according to the embodiment of the present invention.

Next, exchange of schema information between the information-linkage supporting apparatus (middleware 212) and the database server 100 is explained. FIG. 6 is a sequence chart illustrating an example of an exchange procedure of a DB table name and a column name serving as the schema information between the middleware 212 and the database server 100.

First, DB connection processing for securing a session is performed between the middleware 212 and the database server 100. Specifically, the DB-schema-information acquiring unit 221 recognizes the database server 100 to be connected according to a setting content set in advance, transmits a DB connection request to the database server 100, and performs DB open processing for opening the database (step S210).

The database server 100 transmits, in response to the DB connection request, a DB connection response for approving DB connection to the DB-schema-information acquiring unit 221 (step S220). A series of procedures of such DB connection processing is strictly defined by a DB to be connected. In general, using TCP/IP communication, an IP address of the DB to be connected, or a host name, a port number or a user name and a password are provided as parameter information, and the connection to the DB is made.

Subsequently, the DB-schema-information acquiring unit 221 transmits a version check request for checking a version of the DB to be connected to the database server 100 (step S230). The database server 100 transmits, in response to the version check request, a version response for informing what is the version of the DB to the DB-schema-information acquiring unit 221 (step S240). The check of the version of the DB is performed for a check because an SQL sentence to be used is different for each version depending on a type of the DB.

Subsequently, the DB-schema-information acquiring unit 221 issues an SQL sentence that is an SQL command for requesting acquisition of a table name of a table retained by the DB and transmits the SQL sentence to the database server 100 (step S250). As one example, for example, when all table names in the DB are requested, an SQL command of "select * from all_tables;" is issued. The database server 100 transmits, in response to the SQL command, a table name response for informing what is the table name to the DB-schema-information acquiring unit 221 (step S260).

Subsequently, the DB-schema-information acquiring unit 221 issues an SQL sentence that is an SQL command for requesting acquisition of a column name in the table retained by the DB and transmits the SQL sentence to the database server 100 (step S270). As one example, for example, if a connection target is an SQL Server (registered trademark), an SQL command of "sp_columns [table name]" is issued. If the connection target is Oracle (registered trademark), an SQL command of "select * from USER_TAB_COLUMNS where TABLE_NAME='table name' order by COLUMN_ID" is issued.

The database server 100 transmits, in response to the SQL command, a column name response for informing what is a column name to the DB-schema-information acquiring unit 221 (step S280). When receiving the column name response, the DB-schema-information acquiring unit 221 transmits ACK indicating reception completion to the NC apparatus (step S290). In this way, a mechanism for receiving necessary information by transmitting an appropriate SQL sentence in a form matching specifications of the target DB is provided in commercially available DBs.

Note that the DB-schema-information acquiring unit 221 transmits the acquired table name and the acquired column name to the mapping-table generating unit 223.

Exchange of an internal data structure in the NC apparatus, which is NC data, between the middleware 212 and the NC apparatus is now explained. A configuration example of internal data of the NC apparatus is explained. FIG. 7 is a diagram illustrating an internal data structure example of the NC apparatus. Internal data of the NC apparatus shown in FIG. 7 is classified into a plurality of "large segments". Each "large segment" is further subdivided into multiple "small segments". "Label" is given to each "small segment". Information of "data type" indicating a storable information amount is given to each "label". In the example shown in FIG. 7, for example, data of No. 1 to No. 4 are classified into "system information" of the "large segment". Among the data classified into the "system information", the data of No. 3 is classified into "total number of controlled axes" of the "small segment", and given a label of "TotalNumberOfControlledAxes". "Short" is given to this label as the "data type". Note that the internal data shown in FIG. 7 belong to an example of the internal data of the NC apparatus. Naturally, the NC apparatus cannot be operated only with the data. However, machining is performed making use of memory information generally configured as explained above.

FIG. 8 is an imaged diagram of a display screen that the HMI application 213 operating on the middleware 212 causes the display device 201 of the FA personal computer 200 to display. FIG. 8 shows a screen example indicating how information retained by the database server and the NC apparatus is mapped. In an upper part of the display screen in the figure, by illustrating figures of the database server and the NC apparatus, an image of direct connection of the database server and the NC apparatus is shown.

In a region below the figure of the database server on the display screen, tables included in DBs and columns present in each table are disposed. In an example shown in FIG. 8, a column 1 to a column n, which are columns present in the respective tables are shown for the table 1 to the table n. In a region under the figure of the NC apparatus, information included in the NC apparatus is shown for each of the large segments and labels included in the large segments are disposed side by side.

In order to tie the labels to the columns, the user inputs association instruction information for instructing association of the labels and the columns from the input device 202. That is, to tie the labels and the columns, the user sets relation lines between the labels and the columns on the screen. By drawing the relation lines on the screen displayed by the HMI application 213, the labels and the columns are associated to show with which columns the data of the labels are matched. A relation line ID is given to each of the relation lines. The user inputs and gives, for each of the relation lines ID, an operation method for data and operation timing for the data as parameters.

The operation method for the data and the operation timing for the data defines conditions for instructing, concerning NC data subjected to information linkage with the database server 100, what kind of operation should be implemented for the database according to a command transmitted from the NC apparatus to the database server 100, and in other words, conditions of actions in the database server 100 at the time when the NC apparatus inserts the NC data inside the NC apparatus into the database server 100 according to the content of the mapping table. The operation method for the data indicates, concerning the NC data subjected to information linkage with the database server 100, what kind of operation should be implemented in the database. The operation timing for the data indicates at what kind of timing the above-mentioned operation of the data should be implemented for the database.

Examples of the operation method for the data include "INSERT" for instructing addition of the data in the database, "UPDATE" for instructing update of the data in the database, and "SELECT" for instructing acquisition of the data in the database.

If the user performs the above-mentioned work in all the columns and all the labels needed to be subjected to information linkage, the operation of the user is completed. By doing so, for example, as shown in FIG. 8, a relation line is set between a column 2 of the table 1 and a label n of the large segment 1, which are resulted in being mapped. A relation line is also set between a column n of the table 1 and a label n of the large segment n, which are resulted in being mapped. Moreover, a relation line is set between a column 1 of the table 3 and a label 1 of the large segment 1, which are resulted in being mapped.

Figure 9:
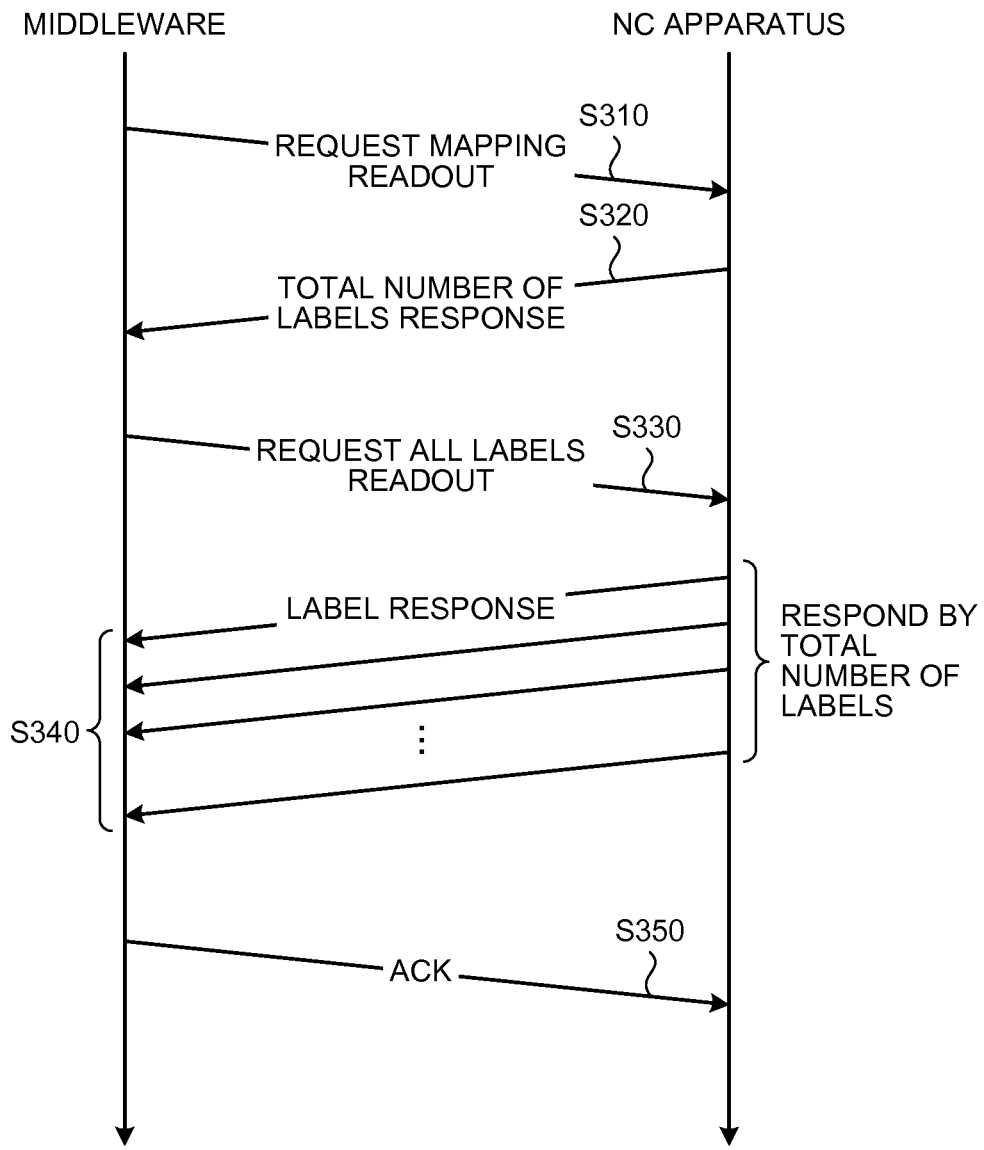
FIG. 9 is a sequence chart illustrating an example of an exchange procedure for internal data between the information-linkage supporting apparatus (middleware) and the NC apparatus according to the embodiment of the present invention.

FIG. 9 is a sequence chart illustrating an example of an exchange procedure of internal data between the information-linkage supporting apparatus (middleware 212) and the NC apparatus. To acquire NC memory map information that is information concerning memory allocation of the memory in the NC apparatus, first, the NC-memory-map-information acquiring unit 222 transmits, to the NC apparatus, a mapping readout request for requesting readout of mapping information of the memory in the NC apparatus for NC data subjected to information linkage with the database server 100 inside the NC apparatus (step S310). The NC apparatus transmits, in response to the mapping readout request, a total number of labels response for sending notification of a total number of labels concerning the NC data subjected to information linkage with the database server 100 (step S320).

Subsequently, the NC-memory-map-information acquiring unit 222 transmits an all-label readout request for requesting readout of all labels to the NC apparatus (step S330). The NC apparatus transmits a label response for sending, for each of the labels, notification of a content of the label to the NC-memory-map-information acquiring unit 222 by the total number of labels (step S340). It is noted that information on the "data type" added to the label is transmitted together with the label response.

The NC-memory-map-information acquiring unit 222 may adopt a method of requesting readout of labels for each of large segments rather than requesting the readout of all the labels at a time. In this case, the NC apparatus transmits the labels to the NC-memory-map-information acquiring unit 222 for each of the large segments.

When receiving all label responses, the NC-memory-map-information acquiring unit 222 transmits ACK indicating reception completion to the NC apparatus (step S350). Note that the DB-schema-information acquiring unit 221 transmits the acquired information of labels and data types, which indicate an internal data configuration of the NC apparatus, to the mapping-table generating unit 223.

Now, how to go about generation of a mapping table in the mapping-table generating unit 223 is explained. FIG. 10 is a diagram illustrating table names and column names of tables included in the database server 100, which are information pieces used for generation of a mapping table in the mapping-table generating unit 223, and an internal data configuration the NC apparatus has. FIG. 10(*a*) illustrates the table names and the column names of the tables the database server 100 has. FIG. 10(*b*) illustrates the internal data configuration the NC apparatus has.

The mapping-table generating unit 223 creates a mapping table obtained by mapping and tabulating combinations of subcombinations of the table names and the column names in the table of the database server 100 with the labels. The mapping is performed on the basis of the content of the association instruction information designated by the HMI application 213, that is, the combination content instructed by the relation lines and the information concerning the operation method for the data and the operation timing for the data, which are parameters instructed for each of the relation line IDs. The mapping-table generating unit 223 transmits the generated mapping table to the mapping-table transmitting unit 224.

In the tabulating, the combinations are divided into combinations of columns and labels and combinations of actions and normalized as two tables using the relation line IDs as main keys thereof. The main keys are the relation line IDs. FIG. 11 is a diagram illustrating an example of the mapping table created by the normalization. FIG. 11(*a*) is a diagram illustrating an example of a mapping table (table 1) created by combinations of (table, column) and (label) using the relation line IDs as main keys. FIG. 11(*b*) is a diagram illustrating an example of a mapping table (table 2) created by combinations with actions using the relation IDs as main keys.

By creating the normalized mapping table, it is possible to reduce redundancy of information in the mapping table, reduce information of the mapping table transmitted to the NC apparatus, and reduce a load at the time when the NC apparatus generates a SQL sentence.

Figure 12:
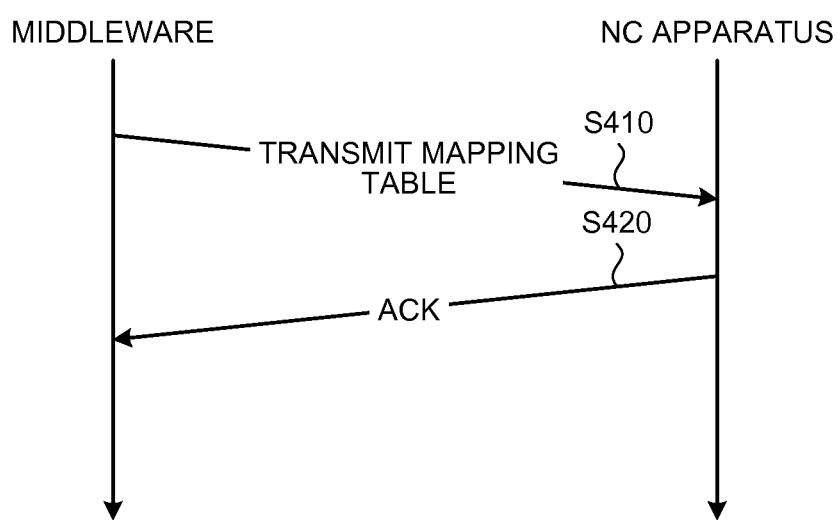
FIG. 12 is a sequence chart illustrating an example of an exchange procedure for data of the mapping table between the information-linkage supporting apparatus (middleware) and the NC apparatus according to the embodiment of the present invention.

FIG. 12 is a sequence chart illustrating an example of an exchange procedure for data of the mapping table between the information-linkage supporting apparatus (middleware 212) and the NC apparatus. The mapping-table transmitting unit 224 transmits the mapping table to the NC apparatus (step S410). When receiving the mapping table, the NC apparatus stores the mapping table into the memory and transmits ACK indicating completion of the reception to the mapping-table transmitting unit 224 (step S420).

Note that, after providing the data of the mapping table to the NC apparatus, the information-linkage supporting apparatus (personal computer 200 for FA) has ended a role of the information-linkage supporting apparatus, and therefore, is disconnected from the network 150. Because the mapping table is stored in the NC apparatus, the information-linkage supporting apparatus is unnecessary for actual operation of the system of the NC apparatus and the database server 100.

Figure 13:
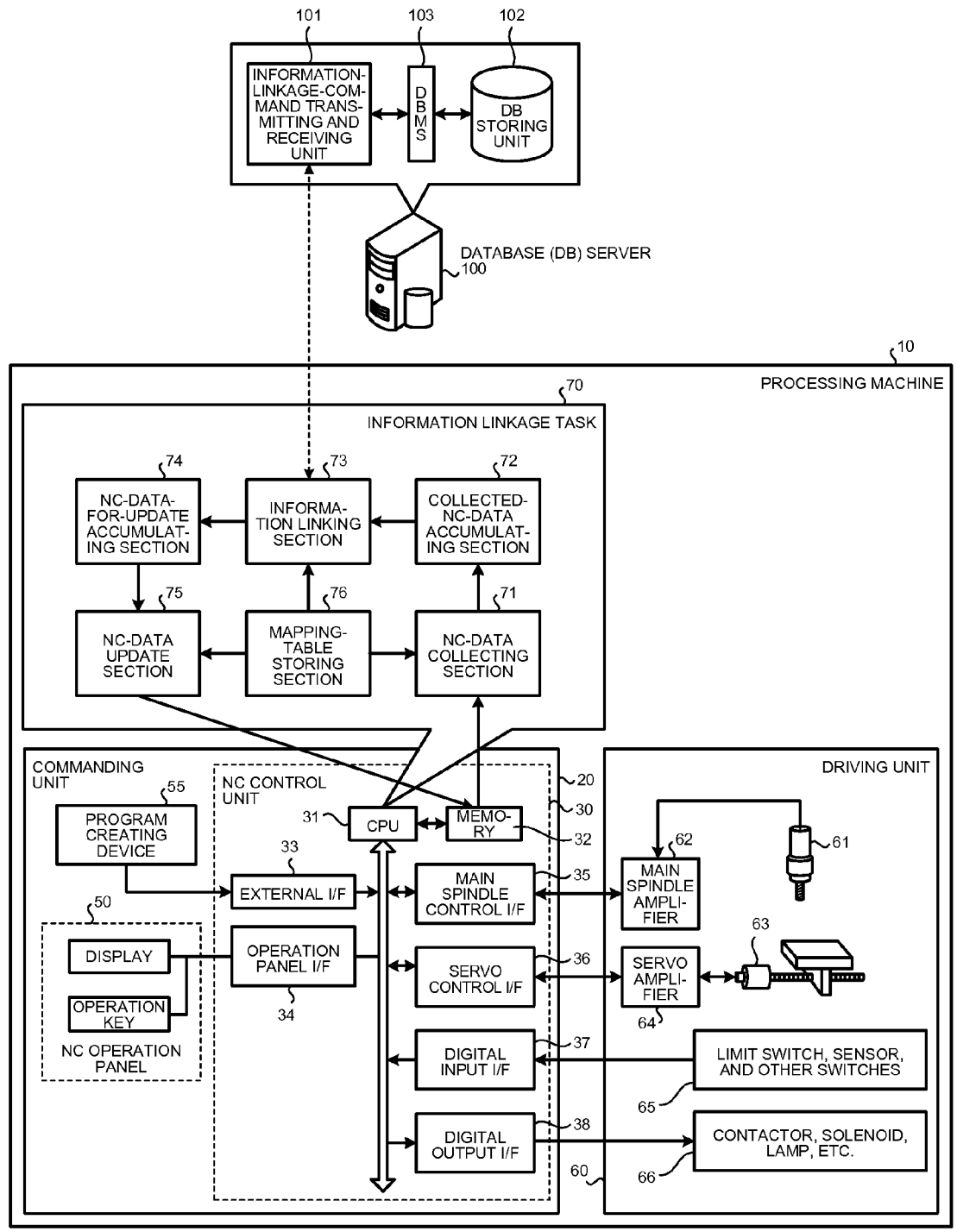
FIG. 13 is a block diagram schematically illustrating an example of a main part functional configuration of an information linkage system including a processing machine and a database server in the embodiment of the present invention.

Next, an example of linkage processing of NC data between the NC apparatus and the database server 100 performed using the mapping table is explained. FIG. 13 is a block diagram schematically illustrating an example of a main part functional configuration of an information linkage system including the processing machine 10 and the database server 100 in this embodiment. The information linkage system has a configuration in which the processing machine 10 and the database server 100 that is the numerical-control-data storing apparatus are connected via a network.

The database server 100 includes, for example, an information-linkage-command transmitting and receiving unit 101, a database storing unit 102 and a database managing unit 103. The information-linkage-command transmitting and receiving unit 101 transmits to and receives from the processing machine 10, an information linkage command for linking the database in the database storing unit 102 with some certain specific NC information retained by the NC apparatus or the processing machine 10 incorporating the NC apparatus (commanding unit 20). The database storing unit 102 has stored therein, in a form of a database, NC information internally present in the processing machine 10. The NC information in the database is subjected to information linkage with the processing machine 10. The database storing unit 102 has a plurality of schemas. The database managing unit 103 performs processing for an access request to the database 100 of the database storing unit 102. The database managing unit 103 performs processing for providing the DB-schema-information acquiring unit 221 with schema information as explained above.

The processing machine 10 includes the commanding unit 20 and a driving unit 60 that is a machining unit. The driving unit 60 includes a main spindle motor 61 that drives to rotate a main spindle controlled by a main spindle amplifier 62, the spindle amplifier 62 that rotates the main spindle by driving the main spindle motor 61, a servo motor 63 that performs control of positions and speeds of a tool and the like with a servo amplifier 64, the servo amplifier 64 that drives the servo motor 63, a limit switch, a sensor, and other switches 65, which are input-signal generating units that acquire an apparatus state of the processing machine 10, and a contactor, a solenoid, and a lamp and the like 66, which are operating units that operate according to an instruction from the commanding unit 20.

The commanding unit 20 includes an NC control unit 30, an NC operation panel 50, and a program creating device 55. The NC operation panel 50 includes a display for displaying information for operating the NC control unit 30 and an operation key that gives an instruction to the NC control unit 30. The program creating device 55 creates a machining program (NC program) representing, in a form of a command to the NC control unit 30, a tool route, a machining condition, or the like necessary for machining in the processing machine 10. The machining program can be created by being downloaded from the program creating device 55 to the NC control unit 30 or by being directly inputted from the NC operation panel 50, and so can be introduced to the NC control unit 30.

The NC control unit 30 includes a CPU 31, a memory 32, an external I/F 33, which is a communication interface with an external device such as the program creating device 55, an operation panel I/F 34, which is a communication interface with the NC operation panel 50, a main spindle control I/F 35, which is a communication interface with the main spindle amplifier 62, a servo control I/F 36, which is a communication interface with the servo amplifier 64, a digital input I/F 37, which is a communication interface with the limit switch, the sensor, and the other switches 65, and a digital output I/F 38, which is a communication interface with the contactor, the solenoid, and the lamp and the like 66.

In the memory 32, there are stored a machining program (NC program) necessary in performing machining, data used in an arithmetic operation by the machining program and outputted as a result of the arithmetic operation, and NC data subjected to information linkage with the database server 100. These data are stored in a volatile memory or a nonvolatile memory according to uses of the data, respectively.

In the memory 32, an information linkage program for performing information linkage with the database server 100 is stored. In this embodiment, mechanisms for performing the information linkage with the database server 100 are implemented by being incorporated as an information linkage task 70 inside the NC apparatus (commanding unit 20) and mounting the mechanisms on the processing machine 10. In the memory 32, the mapping table acquired from the information-linkage supporting apparatus is stored.

The information linkage task 70 includes an NC-data collecting section 71, which is numerical-control-data collecting means, a collected-NC-data accumulating section 72, which is numerical-control-data accumulating means, an information linking section 73 that performs information linkage with the database server 100, an NC-data-for-update accumulating section 74, and an NC-data updating section 75.

The NC-data collecting section 71 recognizes allocation of the data of the memory 32 of the processing machine 10 (NC control unit 30) and the schemas of the DB on the basis of the content of a mapping table stored in a mapping-table storing section 76 provided in the memory 32 and a condition concerning NC data collection set in advance, and collects NC data from the memory 32 of the processing machine 10 (NC control unit 30).

The collected-NC-data accumulating section 72 stores therein and accumulates NC data in the memory 32 of the processing machine 10 collected by the NC-data collecting section 71. Note that, in the following explanation, the NC data collected in this way is also referred to as collected NC data.

The information linking section 73 generates, on the basis of the content of the mapping table stored in the mapping-table storing section 76 provided in the memory 32 and an information linkage condition for the database server 100, which is set in advance, an information linkage command including the NC data collected by the NC-data collecting section 71. An allocation position of a schema of a DB linked with the NC data transmitted to the database server 100 is designated in the information linkage command on the basis of the content of the mapping table. Then, the information linking section 73 transmits the information linkage command to the database of the database server 100 connected to the network.

The information linking section 73 receives an information linkage command (e.g., a response to a "SELECT" command received from the database server 100) from the database server 100, and accumulates NC data for changing the NC data in the memory 32 incidental to the information linkage command, in the NC-data-for-update accumulating section 74.

The NC-data-for-update accumulating section 74 stores NC data for update acquired from the database server 100. The NC data for update are NC data to be used for control in the processing machine 10 and are of information for updating the currently stored NC data.

The NC-data updating section 75 updates, on the basis of the content of the mapping table stored in the mapping-table storing section 76 provided in the memory 32 and a condition set in advance, the NC data of the memory 32 of the processing machine 10 (NC control unit 30) using the NC data for update of the NC-data-for-update accumulating section 74.

Figure 14:
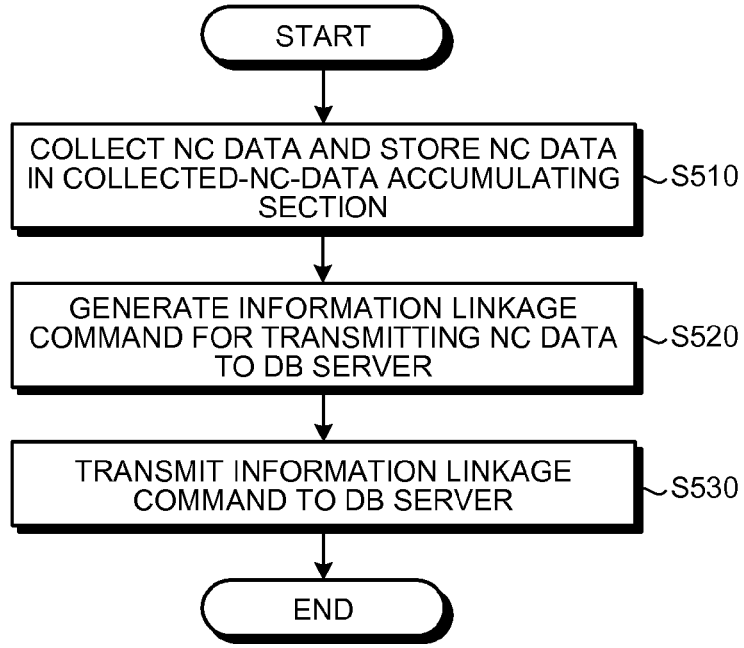
FIG. 14 is a flowchart showing an example of a procedure in an information linkage task in information linkage processing from the processing machine to the database server in the information linkage system including the processing machine and the database server.

Information linkage processing in the NC apparatus having such a configuration is now explained. FIG. 14 is a flowchart showing an example of a procedure in an information linkage task in the case of information linkage processing from the processing machine 10 to the database server 100 in the information linkage system including the processing machine 10 and the database server 100.

First, the NC-data collecting section 71 recognizes, on the basis of the content of the mapping table and a condition concerning NC data collection set in advance, allocation of the data of the memory 32 of the processing machine 10 (NC control unit 30) and the schemas of the DB, collects NC data from the memory 32 of the processing machine 10 (NC control unit 30), and stores the NC data in the collected-NC-data accumulating section 72 (step S510).

Subsequently, the information linking section 73 generates, on the basis of the content of the mapping table and the information linkage condition for the database server 100 set in advance, an information linkage command including the NC data stored in the collected-NC-data accumulating section 72 (step S520). At this point, an allocation position of a schema of a DB linked with the NC data transmitted to the database server 100 is designated in the information linkage command on the basis of the content of the mapping table. Then, the information linking section 73 transmits the information linkage command to the database of the database server 100 connected to the network (step S530) and performs information linkage. Thereafter, the information linkage processing for reflecting the NC data of the processing machine 10 on the database server 100 is completed.

Figure 15:
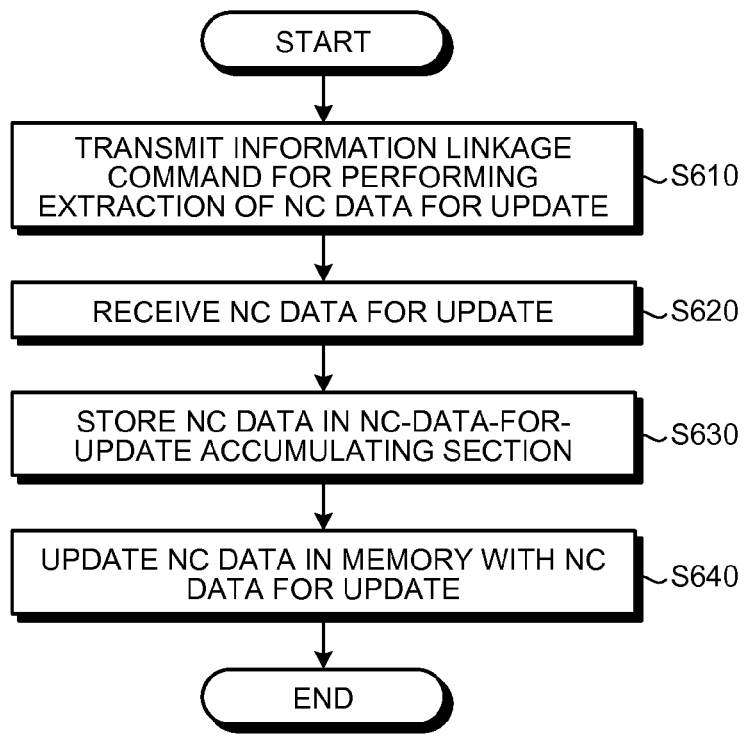
FIG. 15 is a flowchart showing an example of a procedure in an information linkage task in information linkage processing from the database server to the processing machine in the information linkage system including the processing machine and the database server.

FIG. 15 is a flowchart showing an example of a procedure in an information linkage task in the case of information linkage processing from the database server to the processing machine in the information linkage system including the processing machine 10 and the database server 100. First of all, the processing machine 10 transmits, on the basis of the content of the mapping table and the information linkage condition for the database server 100 set in advance, an information linkage command for performing extraction of the NC data for update to the database server 100 (step S610). Note that, as an acquisition request for the NC data for update, a "SELECT" command for performing data extraction is used. Details of a procedure until the acquisition request for the NC data for update is transmitted are substantially the same as the procedure explained with reference to FIG. 14. Therefore, explanation of the details of this procedure is omitted.

When receiving the information linkage command including the acquisition request for the NC data for update, the database server 100 performs extraction of the NC data for update according to the information linkage command and transmits the NC date for update to the processing machine 10 via the information-linkage-command transmitting and receiving section 101.

When receiving the NC data for update (step S620), the information linking section 73 of the information linkage task 70 of the processing machine 10 stores the NC date for update in the NC-data-for-update accumulating section 74 (step S630).

When the NC data for update is stored in the NC-data-for-update accumulating section 74, the NC-data updating section 75 updates, on the basis of the content of the mapping table stored in the mapping-table storing section 76 provided in the memory 32 and the condition set in advance, the content of the NC data of the memory 32 of the processing machine 10 using the NC data for update stored in the NC-data-for-update accumulating section 74 (step S640). After that, the update processing of the NC data for the processing machine 10 is completed.

Usually, the NC apparatus rarely includes a dedicated HMI device. Even if the NC apparatus includes the dedicated HMI device, a display screen is so small that it is extremely difficult to perform linkage of the data with a database on the display screen. Complicated technical terms concerning the database are unfamiliar to operators who handle the NC apparatus and the processing machine. Thus, it is difficult to perform a mapping procedure with the database on the NC apparatus side.

As explained above, in this embodiment, the mapping table created in the information-linkage supporting apparatus is automatically transmitted to and stored in the NC apparatus. By doing so, it is unnecessary to perform the mapping procedure with the database on the NC apparatus side. Thus, it is unnecessary to provide a display device and a procedure execution function for performing a procedure for linking the database with the NC data on the NC apparatus side. Therefore, it is possible to simplify the configuration of the NC apparatus and realize linkage of the NC data between the NC apparatus and the database at low costs.

In this embodiment, the information-linkage supporting apparatus automatically directly accesses the NC apparatus and the database and acquires various kinds of data. The information-linkage supporting apparatus automatically transmits the created mapping table to the NC apparatus via the network and causes the NC apparatus to store the mapping table therein. Therefore, the user's simple inputs of the association instruction information allow the information-linkage supporting apparatus to automatically execute creation of the mapping table and the transmission of the same to the NC apparatus. Thus, it is possible to easily realize linkage of the NC data between the NC apparatus and the database.

In this embodiment, the information-linkage supporting apparatus is connected to the NC apparatus and the database via the network. Therefore, the information-linkage supporting apparatus is not required to be set in a work site where the NC apparatus is disposed. Therefore, increase of footprints in the work site due to the linkage of the NC data between the NC apparatus and the database does not occur.

In this embodiment, the information-linkage supporting apparatus can be configured by using the FA personal computer and the information linkage program, and a dedicated information processing terminal is unnecessary. Therefore, costs such as maintenance expenses of the information processing terminal are not incurred, and so it is possible to inexpensively realize the linkage of the NC data between the NC apparatus and the database. In this embodiment, the personal computer is used only during the creation of the mapping table and the transmission to the NC apparatus, so that any dedicated personal computer is not required and any maintenance costs for the dedicated personal computer is not required accordingly.

In this embodiment, the linkage of the NC data between the NC apparatus and the database is substantially automatically realized. Therefore, the user involved in the database is not required to check or do something about the NC data with operators who handle the NC apparatus and the processing machine for the linkage of the NC data, so that a burden on the user is reduced.

Therefore, according to this embodiment, it is possible to easily and inexpensively realize the linkage of the NC data between the NC apparatus and the database.

INDUSTRIAL APPLICABILITY

As explained above, the information-linkage supporting system according to the present invention is useful for a system that links a database server and an NC apparatus connected via an electric communication line.

REFERENCE SIGNS LIST 10 processing machine
10B laser processing machine
10C electric-discharge processing machine
20A CNC apparatus
20B commanding unit
20C commanding unit
30 NC control unit
31 CPU
32 memory
33 external I/F
34 operation panel I/F
35 main spindle control I/F
36 servo control I/F
37 digital input I/F
38 digital output I/F
50 NC operation panel
55 program creating device
60, 60B, 60C driving unit
61 main spindle motor
62 main spindle amplifier
63 servo motor
64 servo amplifier
65 other switches
66 lamp and the like
70 information linkage task
71 NC-data collecting section
72 collected-NC-data accumulating section
73 information linking section
74 NC-data-for-update accumulating section
75 NC-data updating section
76 mapping-table storing section
100 database server
101 information-linkage-command transmitting and receiving unit 102 database storing unit
103 database managing unit
110 File server
120 FTP (File Transfer Protocol) server
130 Web server
140 App. (application) server
150 network
200 FA personal computer
201 display device
202 input device
203 CPU
204 nonvolatile memory
205 volatile memory
206 memory for display
207 external memory interface
208 communication interface
209 internal bus
212 middleware
213 HMI application
221 DB-schema-information acquiring unit
222 NC-memory-map-information acquiring unit
223 mapping-table generating unit
224 mapping-table transmitting unit

The invention claimed is:

1. An information-linkage supporting apparatus comprising:
   a memory storing computer executable instructions; and
   a processor configured to execute the stored instructions, winch when executed by the processor cause the processor to:
   notify a numerical-control-data storing apparatus of a request for schema information, which is information concerning a configuration of numerical control data stored by the numerical-control-data storing apparatus as a database, wherein the numerical-control-data storing apparatus is connected via a network to the information-linking supporting apparatus and a numerical control apparatus which comprises a machining component that applies machining to a workpiece based on the numerical control data;
   automatically acquire the schema information based on a response from the numerical-control-data storing apparatus responding to the request for the schema information;
   notify the numerical control apparatus of a request for memory map information, which is information concerning memory allocation of the numerical control data stored in a data memory of the numerical control apparatus,
   automatically acquire the memory map information based on a response from the numerical control apparatus responding to the request for the memory map information;
   automatically generate, based on association instruction information input from an outside for instructing association between constituent elements of the schema information and constituent elements of the memory map information, a mapping table, which is the information for information linkage obtained by associating and mapping the constituent elements of the schema information and the constituent elements of the memory map information; and
   transmit the mapping table to the numerical control apparatus.

2. The information-linkage supporting apparatus according to claim 1, wherein the processor is further configured to acquire a column as the schema information and a label of the numerical control data as the memory map information, and associate the column and the label to generate a mapping table in which the column and the label are combined.

3. The information-linkage supporting apparatus according to claim 2, wherein the processor is further configured to generate the mapping table based on division into a normalized plurality of tables.

4. The information-linkage supporting apparatus according to claim 3, wherein the processor is configured to generate, in association with the mapping table in which the column and the label are combined, a mapping table in which conditions of actions to be executed in the numerical-control-data storing apparatus are combined.

5. The information-linkage supporting apparatus according to claim 1, wherein the information-linkage supporting apparatus is disconnected from the network after transmitting the mapping table to the numerical control apparatus.

6. The information-linkage supporting apparatus according to claim 1, further comprises:
   a user interface which receive association instruction information from a user comprising receiving drawn linking lines from the user between a column of the schema information and a label of the numerical control data,
   wherein the schema information and the numerical control data comprise at least one of a machining tool type, a number of spindles, a number of controlled axis, and
   wherein the processor generates a relation line identifier for each of the received drawn linking lines.

7. The information-linkage supporting apparatus according to claim 1, wherein the numerical control apparatus modifies, via the mapping table generated by the processor, the numerical control data that controls the machining component based on data from the numerical-control-data storing apparatus.

8. A non-transitory computer readable medium storing an information-linkage supporting program in an information linkage system in which a numerical control apparatus and a numerical-control-data storing apparatus are connected via a network, the numerical control apparatus including a machining unit that applies machining to a workpiece, a data memory that stores numerical control data to be used in the machining of the workpiece and a control unit that performs an arithmetic operation using data in the data memory and controls the machining unit, the numerical-control-data storing apparatus being configured to have a database and storing, as the database, data including the numerical control data used in the numerical control apparatus, the information linkage system performing information linkage to match the numerical control data between the numerical control apparatus and the numerical-control-data storing apparatus, the information-linkage supporting program creating information for information linkage retained by the numerical control apparatus and used for the information linkage,
   the information-linkage supporting program causing a computer apparatus connected to the information linkage system via the network to execute:
   a schema-information acquiring procedure for notifying the numerical-control-data storing apparatus of a request for schema information, which is information concerning a configuration of the numerical control data stored by the numerical-control-data storing apparatus as a database, and automatically acquiring the schema information based on a response from the numerical-control-data storing apparatus responding to the request for the schema information;

a memory-map-information acquiring procedure for acquiring memory map information, which is information concerning memory allocation in the data memory for the numerical control data stored by the numerical control apparatus in an inside thereof, from the numerical control apparatus;

a mapping-table generating procedure for automatically generating, based on association instruction information input from an outside for instructing association between constituent elements of the schema information and constituent elements of the memory map information, a mapping table, which is information for the information linkage obtained by associating and mapping the constituent elements of the schema information and the constituent elements of the memory map information; and a mapping-table transmitting procedure for transmitting the mapping table to the numerical control apparatus.

9. The non-transitory computer readable medium according to claim 8, wherein a column is acquired as the schema information in the schema-information acquiring procedure, a label of the numerical control data is acquired as the memory map information in the memory-map-information acquiring procedure, and in the mapping-table generating procedure, the column and the label are associated with each other to generate a mapping table in which the column and the label are combined.

10. The non-transitory computer readable medium according to claim 9, wherein, in the mapping-table generating procedure, the mapping table is generated based on division into a normalized plurality of tables.

11. The non-transitory computer readable medium according to claim 10, wherein, in the mapping-table generating procedure, a mapping table in which conditions of actions executed in the numerical-control-data storing apparatus are combined is generated in association with the mapping table in which the column and the label are combined.

* * * * *